(12) United States Patent
Ogusu

(10) Patent No.: US 6,236,636 B1
(45) Date of Patent: May 22, 2001

(54) SPINDLE MOTOR INCLINATION ANGLE ADJUSTING MECHANISM IN OPTICAL DISK APPARATUS

(75) Inventor: Mikio Ogusu, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/198,906

(22) Filed: Nov. 24, 1998

(30) Foreign Application Priority Data

Nov. 28, 1997 (JP) .................................................. 9-343718

(51) Int. Cl.[7] ............................ G11B 19/20; G11B 23/00
(52) U.S. Cl. ........................................... 369/258; 369/270
(58) Field of Search ............................. 369/258, 264.27, 369/271

(56) References Cited

U.S. PATENT DOCUMENTS

| | | | | |
|---|---|---|---|---|
| 4,373,200 | * | 2/1983 | Dunlop ................................. | 369/263 |
| 4,438,879 | * | 3/1984 | Rudi .................................... | 226/188 |
| 4,506,857 | * | 3/1985 | Hara et al. ............................ | 248/655 |
| 5,796,707 | * | 8/1998 | Kim ..................................... | 369/219 |
| 5,867,471 | * | 2/1999 | Kim et al. ............................. | 369/258 |
| 5,933,408 | * | 8/1999 | Park et al. ............................ | 369/271 |
| 6,005,836 | * | 12/1999 | Choi .................................... | 369/219 |
| 6,014,362 | * | 1/2000 | Park .................................... | 369/258 |

FOREIGN PATENT DOCUMENTS

| | | | |
|---|---|---|---|
| 2 085 635A | * | 4/1982 | (GB) . |
| 59-73621 | * | 4/1984 | (JP) . |
| 61-061268 | * | 3/1986 | (JP) . |
| 61-090317 | * | 5/1986 | (JP) . |
| 61-150162 | * | 7/1986 | (JP) . |
| 1-279459 | * | 11/1989 | (JP) . |
| 3-228229 | * | 10/1991 | (JP) . |
| 4-243021 | * | 8/1992 | (JP) . |
| 8-17135 | * | 1/1996 | (JP) . |
| 8-147867 | * | 6/1996 | (JP) . |
| 8-249805 | * | 9/1996 | (JP) . |
| 9-223353 | * | 8/1997 | (JP) . |
| 10-208372 | * | 8/1998 | (JP) . |
| 10-208373 | * | 8/1998 | (JP) . |

* cited by examiner

*Primary Examiner*—William Klimowicz
(74) *Attorney, Agent, or Firm*—Pillsbury Winthrop LLP

(57) ABSTRACT

A spindle motor inclination angle adjusting mechanism in an optical disk apparatus including a spindle motor. The spindle motor is mounted on a motor base (122) in such a manner as to be tiltable in a direction around a second tilt movement axis. The motor base is mounted on a chassis in such a manner as to be tiltable in a direction around a first tilt movement axis. The spindle motor is urged in the direction around the first and second tilt movement axes by a leaf spring. By turning adjuster screws, the spindle motor is moved backward against the resilient force of the spring, thereby effecting adjustment of the inclination angle thereof in the direction around the first and second tilt movement axes independently.

9 Claims, 10 Drawing Sheets

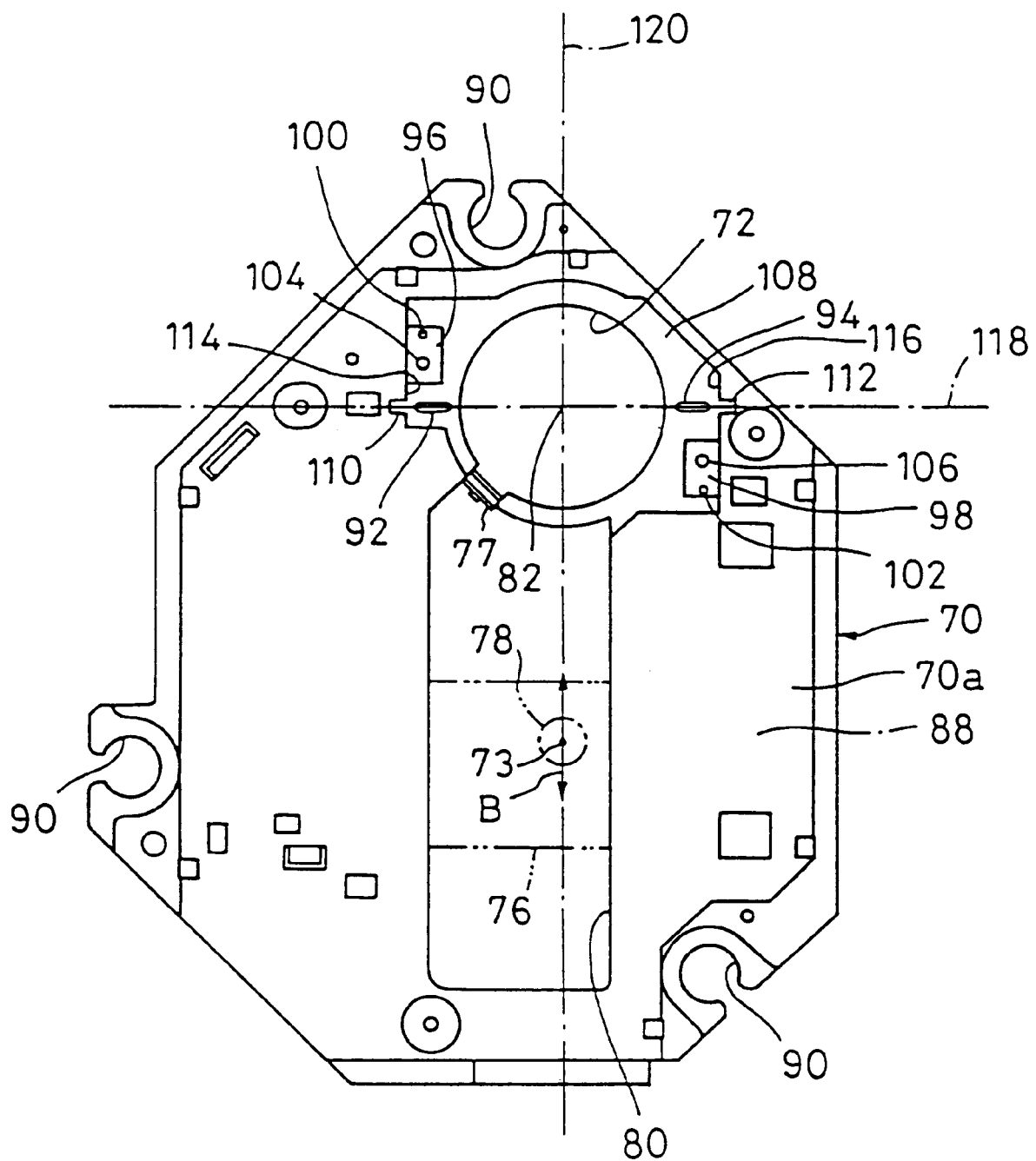
F I G. 5

DIRECTION OF URGE BY
LEAF SPRING 160

SPINDLE MOTOR INCLINATION ANGLE ADJUSTING MECHANISM IN OPTICAL DISK APPARATUS

BACKGROUND OF THE INVENTION

This invention relates generally to an inclination angle adjusting mechanism, in an optical disk apparatus for data recording and reproduction on and from a CD (Compact Disc), DVD (Digital Versatile Disk) or the like, for adjusting the inclination of a spindle motor relative to a chassis so that a rotary shaft of the spindle motor lies parallel to an optical axis of an optical pickup. More specifically, the invention relates to such an inclination angle adjusting mechanism which allows independent adjustment of the inclination angle in a track-widthwise direction and a track-tangential direction and reduces the amount of movement of a turntable upon adjustment.

For storing information in an optical disk or reproducing the information from the optical disk, it is necessary for an optical axis of an optical pickup to pass perpendicularly to a storage surface of the optical disk. For this purpose, a rotary shaft of a spindle motor of an the optical disk apparatus and the optical axis of the optical pickup need to be arranged parallel to each other. However, due to a molding error and/or an assemblage error in a chassis of the optical disk apparatus, the rotary shaft of the spindle motor and the optical axis of the optical pickup maybe arranged somewhat offset from the desired parallel state. Therefore, an inclination angle adjusting mechanism is installed on the chassis so that after completion of assemblage, the spindle motor can be inclined relative to the chassis to thereby place the rotary shaft of the spindle motor parallel to the optical axis of the optical pickup. The inclination angle adjustment is carried out before shipping of the resulting product.

FIGS. 2A–2D hereof show a conventional inclination angle adjusting mechanism. A chassis 10 includes pedestals 12, 14 fixedly disposed thereon. The pedestals 12, 14 have inclined surfaces 12a, 14a on which a motor base 18 with a spindle motor fixedly disposed thereon is placed. Part 18c of the pedestal 18 abuts against an inclined cam surface 37a at an upper end of a cylindrical cam 37 rotatably attached to the chassis 10. A turntable 22 is mounted on a rotary shaft 20 of a spindle motor 16. Screws 24, 26, 28 pass through the motor base 18 and are threaded into the mecha-chassis 10. Around the screws 24, 26, 28, springs 31, 32, 33 are disposed in their compressed states such that their resilient forces press the motor base 18 against the pedestal inclined surfaces 12a, 14a and cam surface 37a. An eccentric cam 27 has an eccentric pin 29 which is engaged in a cam hole 30 of the motor base 18. By turning the eccentric cam 27 in a direction of arrow K with the eccentric pin 29 engaged in the cam hole 30, the motor base 18 is caused to move in a direction of arrow L while ends 18a, 18b of the motor base 18 slide along the inclined surfaces 12a, 14a of the pedestals 12, 14, thereby completing the adjustment of the inclination angle in one direction (track-tangential direction) of the spindle motor 16 relative to the chassis 10. At this time, the pins 25, 27 fixedly secured to the chassis 10 are engaged in recesses 18d, 18d of the motor base 18 thereby inhibiting sliding movement of the motor base 18 in a direction perpendicular to the rotary shaft 20 and to the arrow L. By turning the cylindrical cam 37 in a direction of arrow M, the motor base 18 rotates about an axis N or N' corresponding to its side portions placed in contact with the pedestal inclined surfaces 12, 14, thereby perfecting the adjustment of inclination angle in another direction (truck-widthwise direction).

Japanese Patent Laid-Open Publication No. HEI-8-17135 shows another conventional inclination angle adjusting mechanism as illustrated in FIG. 3 hereof. A turntable 38 is mounted to a rotary shaft 36 of a spindle motor 35 which is fixedly disposed on a motor base 40. The motor base 40 is mounted to a chassis 41 at three points C, D and E. At point C, the motor base 40 and the chassis 41 are connected together through a screw 42 with a spacer 44 sandwiched therebetween, whereby the motor base 40 is rendered capable of tilt actions at point C as a fulcrum in all directions. At point D, the chassis 41 and the motor base 40 are connected together via a screw 48 with a spring 46 sandwiched therebetween. In correspondence with the amount of screwing of the screw 48, the inclination angle of the motor base 40 is adjusted, using line F passing over points C and E as a tilt movement axis, in a direction around line F. At point E, the chassis 41 and the motor base 40 are connected together via a screw 52 with a spring 50 sandwiched therebetween. In correspondence with the depth or amount of screwing of the screw 5, the inclination angle of the motor base 40 is adjusted, using line G passing over points C and D as a tilt movement axis, in a direction around line G.

Japanese Patent Laid-Open Publication No. HEI-9-223353 discloses a still another conventional inclination angle adjusting mechanism as illustrated in FIG. 4 hereof. A spindle motor 53 includes a rotary shaft 54 to which a turntable 56 is mounted. The spindle motor 53 is fixedly disposed on a motor base 58. The motor base 58 is supported by a chassis 60 tiltably in all directions at point H. At point I, the chassis 60 and the motor base 58 are connected together by means of a screw 64 with a spring 62 sandwiched therebetween. In correspondence with the depth of threaded engagement of the screw 64, the inclination angle of the motor base 58 is adjusted, using a line passing over points H and J as a tilt movement axis, in a direction around the line or tilt movement axis. At point J. the chassis 60 and the motor base 58 are connected together by means of a screw 68 with a spring 66 sandwiched therebetween. In correspondence with the depth of screwing of the screw 68, the inclination angle of the motor base 58 is adjusted, using a line passing over points H and I as a tilt movement axis, in a direction around the line.

In the conventional inclination angle adjusting mechanism shown in FIG. 2, the height of the turntable 22 is influenced by a bend position error in the end portions 18a, 18b of the motor base 18 and positional and angular errors in the pedestal inclined surfaces 12a, 14a, thereby making it difficult to ensure precision of the height of the turntable 22. These positional and angular errors also reflect upon the track-tangential-direction position of the turntable 22, thus causing the direction of movement of the optical axis by the feed action of the optical pickup to be offset from a direction normal to a central axis of the optical disk. In addition, since a central axis of the tilt action of the eccentric cam 27 is imaginary, difficulty is experienced in establishing the axis at one point clearly.

In the conventional inclination angle adjusting mechanism shown in FIG. 3, since the motor base 40 vertically swings about point C the screws 48, 52 are turned, the turntable 38 vertically moves largely during inclination adjustment. There is therefore a problem such that focusing cannot be achieved where a displacement range of a focus actuator of the optical pickup is small. Further, as the screw 48 is turned, the motor base 40 tilts at the oblique tilt movement axis F passing over points C and E. This causes a tilt action to arise in both tangential and widthwise directions with respect to tracks of the optical disk, thus rendering the adjustment difficult to achieve.

In the prior inclination adjusting mechanism shown in FIG. 4, since the motor base 58 vertically swings about point H as the screws 64, 68 are turned, the turntable 56 vertically moves largely. As a result, focusing cannot be achieved where a displacement range of a focus actuator of the optical pickup is small.

SUMMARY OF THE INVENTION

It is therefore an object of the present invention to provide a spindle motor inclination angle adjusting mechanism which allows inclination angle adjustment in track-widthwise and track-tangential directions independently and reduces the amount of movement of the turntable upon adjustment.

According to the present invention, there is provided a spindle motor inclination angle adjusting mechanism, in an optical disk apparatus including a spindle motor with a rotary shaft carrying a turntable thereon, a chassis supporting the spindle motor thereon, and an optical pickup disposed on the chassis transferably so that an optical axis of the optical pickup can be moved in a direction substantially perpendicular to the rotary shaft of the spindle motor, for adjusting inclination of the spindle motor relative to the chassis, which adjusting mechanism comprises: a tilt movement mechanism for supporting the spindle motor on the chassis tiltably both in a direction around a first tilt movement axis extending in a direction perpendicular to the rotary shaft of the spindle motor and perpendicular to a direction of movement of the optical axis of the optical pickup and in a direction around a second tilt movement axis extending in a direction of movement of the optical axis of the optical pickup and being perpendicular to the rotary shaft of the spindle motor; a first adjusting section for adjusting the inclination angle in the direction around the first tilt movement axis by driving the spindle motor in the direction around the first tilt movement axis; and a second adjusting section for adjusting the inclination angle in the direction around the second tilt movement axis by driving the spindle motor in the direction around the second tilt movement axis.

According to this invention, the spindle motor is supported on the chassis such that it can tilt in both the direction around the first tilt movement axis extending in the direction perpendicular to the rotary shaft of the spindle motor and perpendicular to the direction of movement of the optical axis of the optical pickup, and the direction around the second tilt movement axis perpendicular to the rotary shaft of the spindle motor and extending in the direction of movement of the optical axis of the optical pickup. The spindle motor is driven, by means of the first adjusting section, in the direction around the first tilt movement axis relative to the chassis to thereby effect the inclination angle adjustment in the direction around the first tilt movement axis. The spindle motor is also driven, by means of the second adjusting section, in the direction around the second tilt movement axis relative to the chassis to thereby effect the inclination angle adjustment in the direction around the second tilt movement axis. Accordingly, it becomes possible to effect the inclination angle adjustment in the direction around the first tilt movement axis and in the direction around the second tilt movement axis independently, thus rendering the adjustment operation easy. Further, since the second and first tilt movement axes are positioned to pass over the rotary shaft of the spindle motor, it becomes possible to reduce the amount of vertical movement of the turntable upon inclination angle adjustment and to avoid a problem such that focusing can not be performed when the range of displacement of a focus actuator is small.

The tilt movement mechanism may have an arrangement wherein the spindle motor is supported on the motor base tiltably in the direction around the second tilt movement axis and the motor base is supported on the chassis tiltably in the direction around the first tilt movement axis.

The first and second adjusting sections may comprise an urging section for urging the spindle motor in the direction around the first and second tilt movement axes, a first pressing member for pressing the spindle motor back in the direction around the first tilt movement axis against the urging force of the urging section to thereby adjusting the inclination angle in the direction around the first tilt movement axis, and a second pressing member for pressing the spindle motor back in the direction around the second tilt movement axis against the urging force of the urging section to thereby adjust the inclination angle in the direction around the second tilt movement axis.

The urging section may comprise two separate urging sections, one for imparting an urging force in the direction around the first tilt movement axis and the other for imparting an urging force in the direction around the second tilt movement axis. In this instance, the urging section for imparting an urging force in the direction around the first tilt movement axis may be arranged to impart a pressing force to the spindle motor. It may also be arranged to impart a pressing force directly to the motor base.

The first tilt movement axis may be provided by an arrangement wherein the motor base is provided with extended portions of narrow width on opposite sides thereof with the rotary shaft interposed therebetween, and the extended portions have a direction of extension perpendicular to the direction of movement of the optical axis of the optical pickup and are supported on the chassis rotatably in a direction around an axis formed by the direction of extension.

In this instance, the extended portions of the motor base may be supported on the chassis with lower surfaces thereof placed on projections formed on the chassis and with upper surfaces thereof held in contact with projections of a leaf spring mounted on the chassis. The leaf spring projections may be positioned offset relative to the mecha-chassis projections so that they produce a moment which imparts to the motor base an urging force in the same direction as that of an urging force directed around the first tilt movement axis by the urging means.

The second tilt movement axis may be provided by an arrangement wherein protrusions are formed on opposite sides, interposing the rotary shaft of the spindle motor therebetween, of an end surface, opposed to the turntable, of an outer cylinder of the spindle motor, at positions along the second tilt movement axis, and the motor base is mounted on the protrusions in such a manner as to be tiltable in the direction around the second tilt movement axis about the protrusions forming a fulcrum.

The protrusions may be formed of metallic pins. In this instance, the second tilt movement axis may be established by providing an arrangement wherein the pins pass through the motor base to support the motor base tiltably about the metallic pins as a fulcrum and have upper parts having an increased diameter for preventing retrieval thereof from the motor base, and a spring is disposed between the outer cylinder end surface of the spindle motor and the motor base for urging the motor base against the increased diameter parts of the metallic pins such that the motor base becomes tiltable about the contact portion as a fulcrum.

The spindle motor inclination angle adjusting mechanism according to the present invention may be arranged such that the spindle motor is tiltably received in a sleeve disposed in the chassis and having an inner diameter larger than an outer diameter of the spindle motor, the urging section comprises a leaf spring mounted on the sleeve for pressing an outer cylinder side surface of the spindle motor to impart to the spindle motor an urging force in the directions around the first and second tilt movement axes, the first pressing member comprises a first screw extending in a direction parallel to the second tilt movement axis and perpendicular to the rotary shaft of the spindle motor, mounted on the sleeve and passing through the sleeve for pressing the outer cylinder side surface of the spindle motor in the direction around the first tilt movement axis, and the second pressing member comprises a second screw extending in a direction parallel to the first tilt movement axis and perpendicular to the rotary shaft of the spindle motor, mounted on the sleeve and passing through the sleeve for pressing the outer cylinder side surface of the spindle motor in the direction around the second tilt movement axis.

BRIEF DESCRIPTION OF THE DRAWINGS

A preferred embodiment of the present invention will hereinafter be described in detail, by way of example only, with reference to the accompanying drawings, in which:

FIG. 5 is a top plan view illustrating a mecha-chassis according to a preferred embodiment of the present invention;

DESCRIPTION OF A PREFERRED EMBODIMENT

Figure 6:
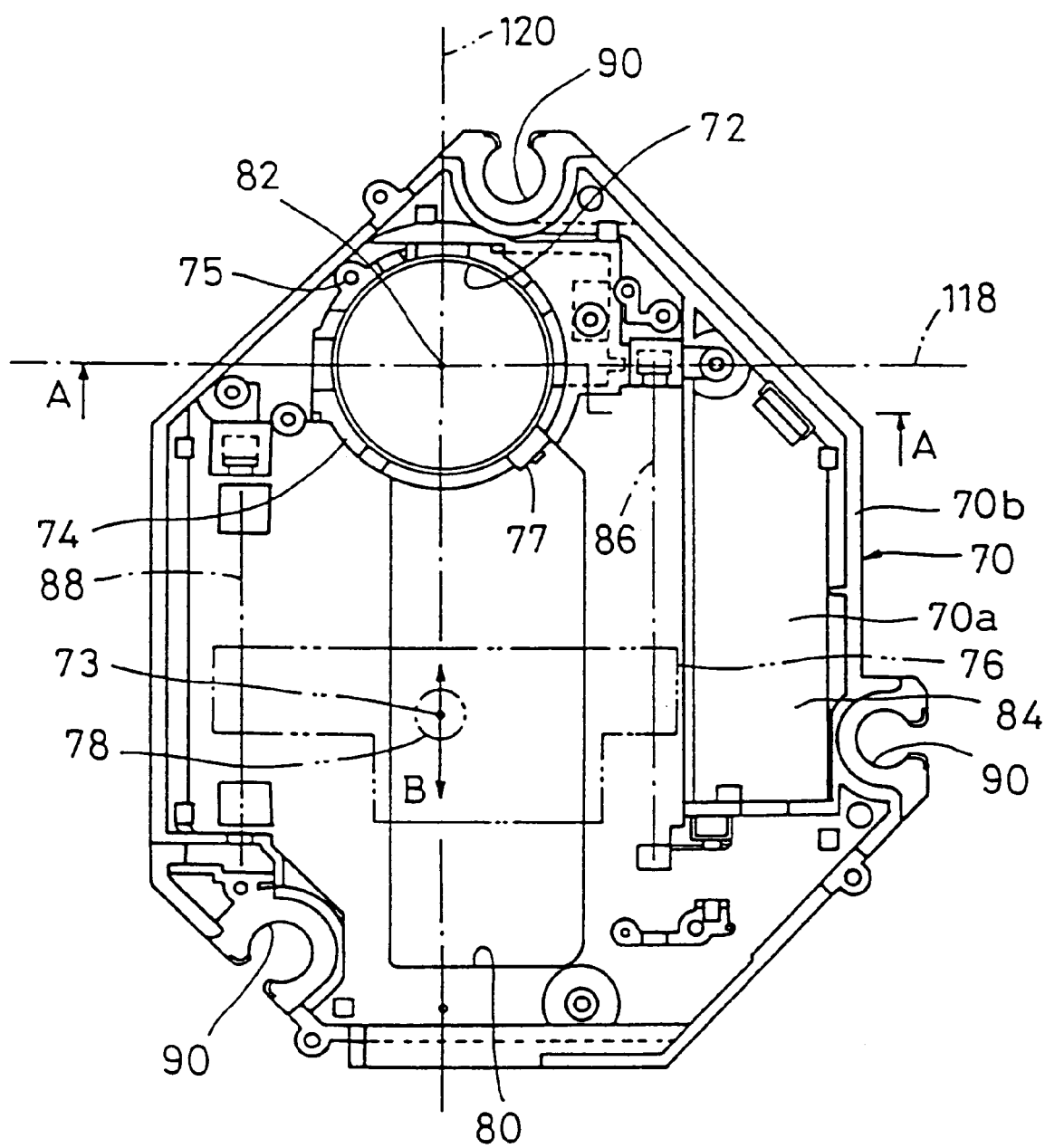
FIG. 6 is a bottom view of the chassis.
Figure 7:
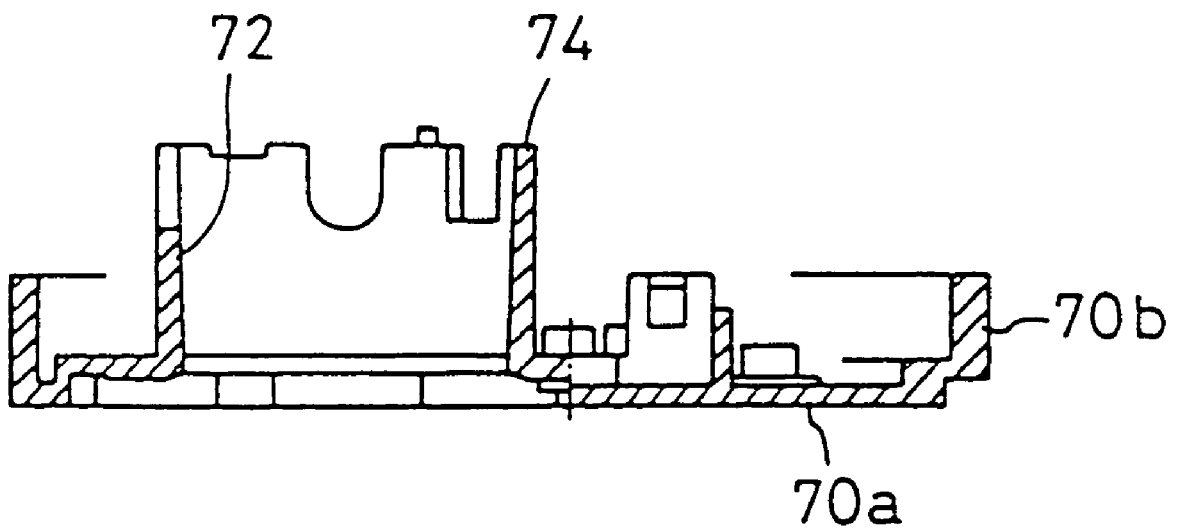
FIG. 7 is a cross-sectional view taken along line A—A of FIG. 6.

Discussion will now be made as to a preferred embodiment of the present invention. The structure of a chassis is shown in FIGS. 5–7 in top plan, bottom plan and cross section. The chassis 70 is integrally molded in its entirety from rigid plastics of high dimension stability such as PPE (poly(phenylene ether)). The chassis 70 takes the form of a sheet of plate 70a and has a rib 70b provided at its lower surface edge to extend along the entire circumference thereof. The chassis plate 70a has a circular opening 72 for disposing a spindle motor. On the underside of the chassis plate 70a, a cylindrical sleeve 74 is provided such that it allows the opening 72 to extend perpendicularly to the chassis plate 70a. The opening 72 increases in diameter toward an open end of the sleeve 74 so as to allow the tilt action of the spindle motor. The sleeve has a screw hole 75 for mounting a metallic tap plate which supports an adjuster screw, and a leaf spring mount 77 for mounting a leaf spring which produces an urging force for tilt movement.

In addition, the chassis plate 70a has an opening 80 for allowing upward passage, along a direction of movement of an optical pickup 76 disposed on the underside of the chassis plate 70a, of an optical axis 73 of an object lens of the pickup so that the laser light can be directed on a record surface of an optical disk. The position of a rotary shaft 82 of the spindle motor (position-when an inclination angle is 0°, that is, the position when the rotary shaft. 82 is perpendicular to the chassis plate 70a) is on an extension of a direction of movement B of the optical pickup optical axis 73.

On the reverse side of the chassis 70 (see FIG. 6), a motor for transferring the optical pickup 76 is provided in a motor positioning space 84. Along a single-dot-and-dash line 86 is provided a transfer screw which is rotation-driven by rotation of the transfer motor transmitted via a gear. On an opposite side of the opening 80, a slide rod is positioned along a single-dot-and-dash line 88 such that it lies parallel to the transfer screw. The optical pickup 76 is supported by the transfer screw and the slide rod and transferred toward the rotary shaft 82 of the spindle motor by the drive of the transfer screw. On a peripheral edge of the chassis plate 70a, there are provided three recesses 90 for mounting a damper which supports the chassis 70 an a main chassis within the optical disk apparatus.

The front or upper surface of the chassis plate 70a is depressed at a portion surrounding the opening 72 to provide a hollow portion 108. On opposite sides radially spaced apart with the opening 72 interposed therebetween, the hollow portion 108 is provided with projections 92, 94 of semicircular section for supporting thereon a base along a direction perpendicular to both the movement direction B of the optical axis 73 of the optical pickup 76 and the rotary shaft of the spindle motor. Provided closely to the projections 92, 94 are pedestals 96, 98 for mounting a leaf spring which in turn mounts a motor base to the chassis 70. The pedestals 96, 98 has projections 100, 102 for supporting the rear end of the respective leaf spring, and screw holes 104, 106 for allowing threadedly engagement with screws for fixing the leaf spring.

At an extension of each projection 92, 94 in the hollow portion 108, there are provided recessed portions 110, 112 for limiting the movement of the motor base along the movement direction B of the optical axis 73. Wall surfaces 114, 116 on entrance opposite sides of the recessed portions 110, 112 serve as limit surfaces for restricting the movement of the motor base in a direction perpendicular to the movement direction B of the optical axis 73.

First tilt movement axis 118 is provided to extend in a direction perpendicular to the rotary shaft 82 of the spindle motor and to the movement direction B of the optical axis 73 of the optical pickup 76, as explained below. Similarly, a second tilt movement axis 120 is provided to extend in a direction perpendicular to the rotary shaft 82 of the spindle motor and to the movement direction B of the optical axis 73 of the optical pickup 76.

Figure 1A:
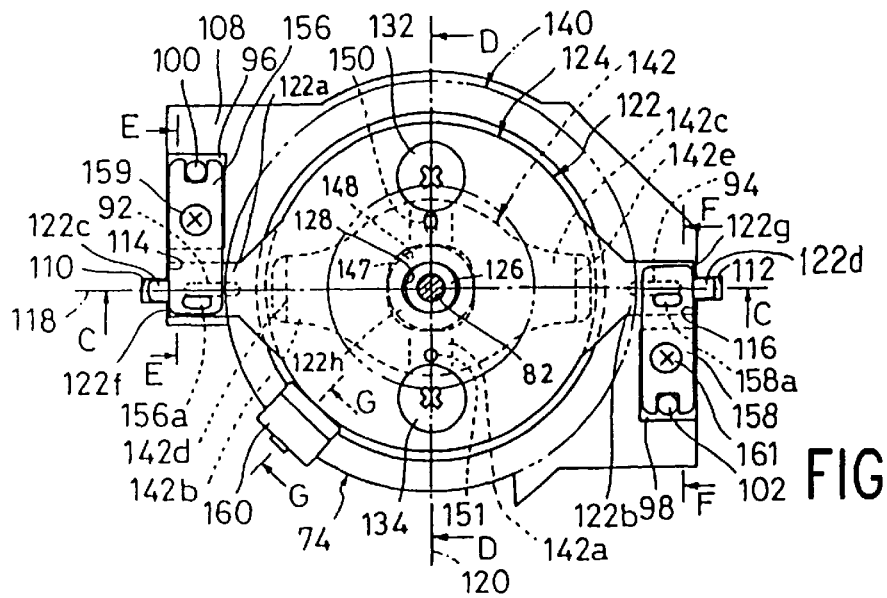
FIG. 1A illustrates in front elevation a preferred embodiment of the present invention.
Figure 1B:
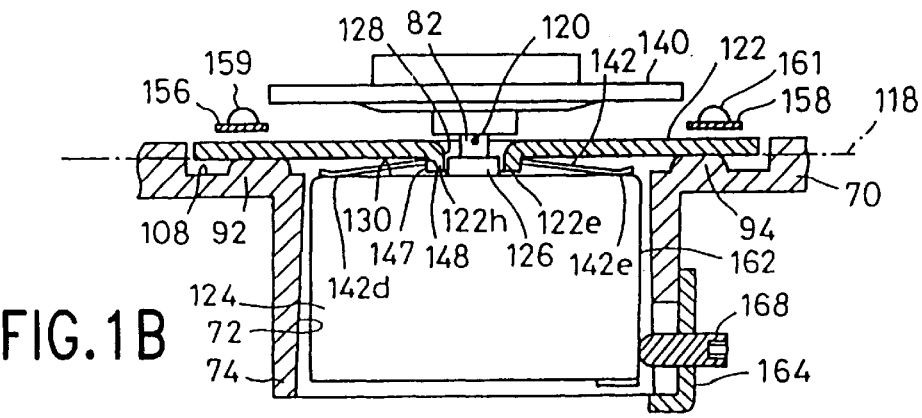
FIG. 1B is a cross-sectional view taken along line C—C of FIG. 1A.
Figure 1C:
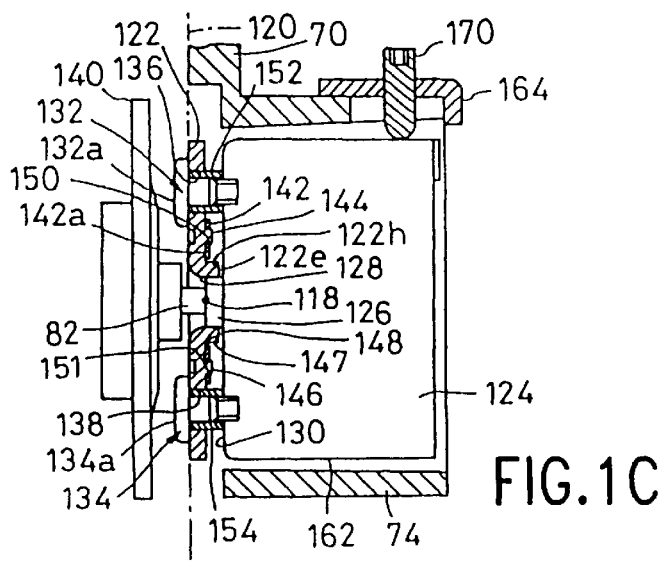
FIG. 1C is a cross-sectional view taken along line C—D of FIG. 1A.
Figure 2A:
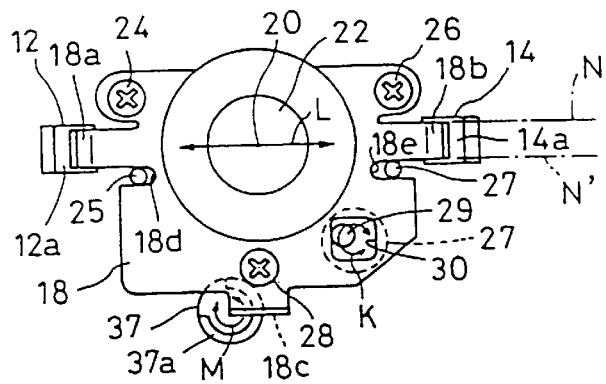
FIG. 2A illustrates in top plan a conventional inclination angle adjusting mechanism.
Figure 2B:
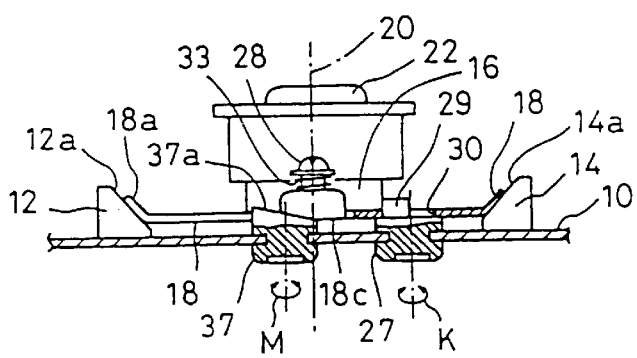
FIG. 2B is a front elevational view of the conventional mechanism.
Figure 2C:
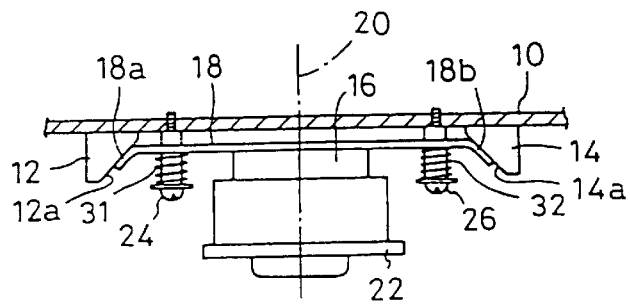
FIG. 2C is a rear elevational view of the conventional mechanism.
Figure 2D:
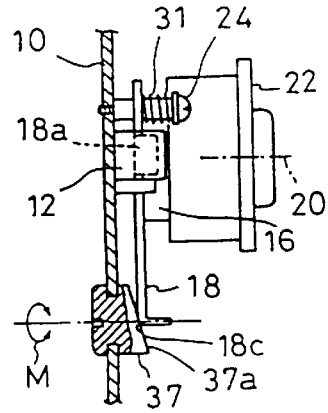
FIG. 2D is a side elevational view of the conventional mechanism.
Figure 3A:
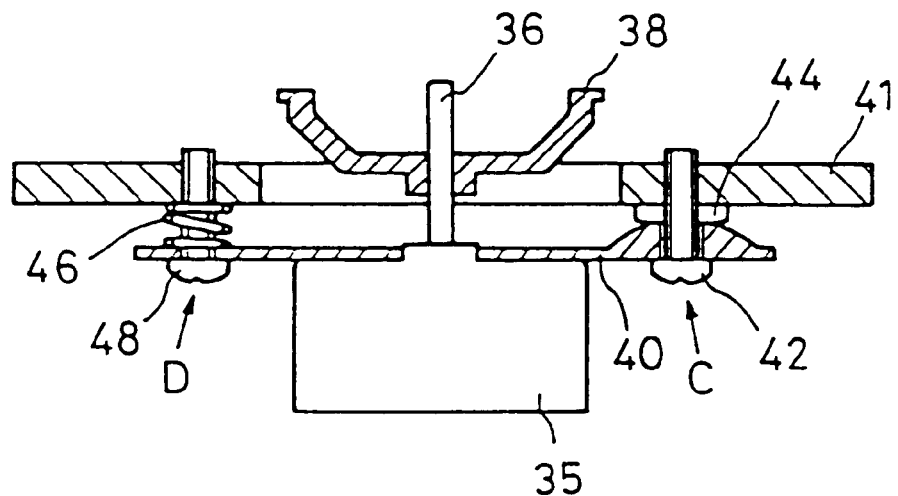
FIG. 3A illustrates in cross-section another conventional inclination angle adjusting mechanism, the cross-section being taken along line II—II of FIG. 3B.
Figure 3B:
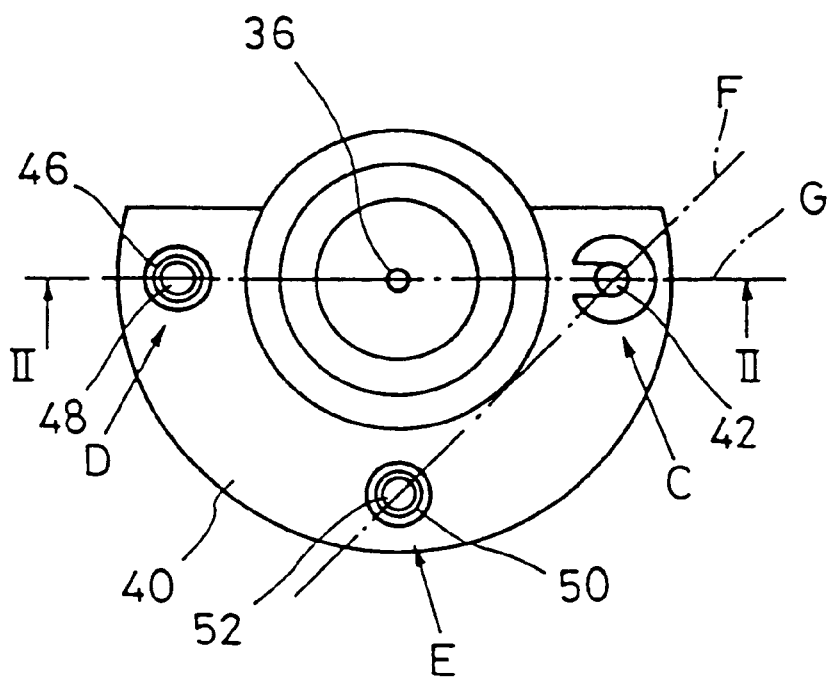
FIG. 3B is a top plan view of the mechanism of FIG. 3A.
Figure 4A:
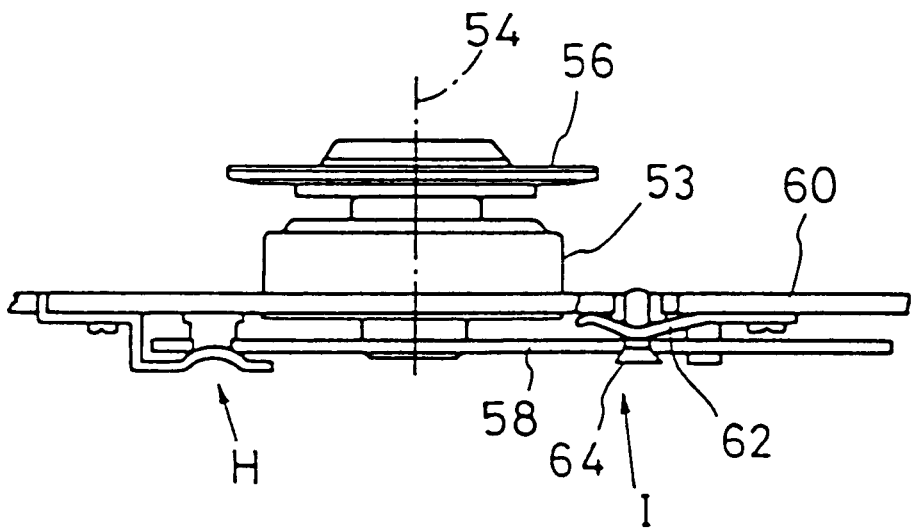
FIG. 4A illustrates in front elevation still another conventional inclination angle adjusting mechanism.
Figure 4B:
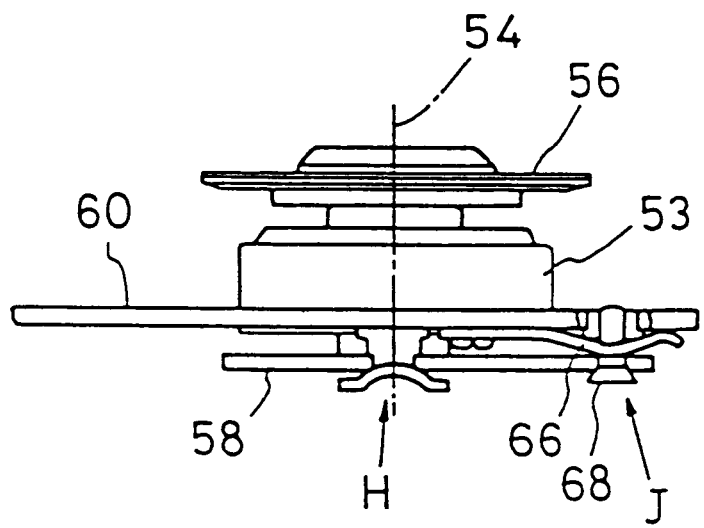
FIG. 4B is a side elevational view of the mechanism of FIG. 4A.

Reference is now made to FIGS. 1A–1C illustrating the arrangement of the motor base to be mounted to the chassis 70, with the spindle motor attached thereto. The motor base 122 comprises a metallic plate formed of, e.g., iron. A hole 128 is provided centrally of the motor base 122 and removably receives a bearing 126 of the rotary shaft 82 of the spindle motor 124. The hole 128 has a slightly longer diameter in a direction along the first tilt movement axis 118 and hence is transversely oblong so that the motor base 122 is rendered capable of tilt action in a direction around the second tilt movement axis 120.

At positions along the second tilt movement axis 120, on opposite sides, interposing the rotary shaft 82 of the spindle motor 124 therebetween, of the motor base 122, there are provided holes 136, 138 for receiving screws 132, 134 for mounting the motor base 122 to an outer cylinder end surface 130 of the spindle motor 124. At positions along the second tilt movement axis 120, located closer than the holes 136, 128 to the rotary shaft 82, there are provided protrusions 144, 146, formed by half-punching from an upper side, for blocking rotation in a direction around the rotary shaft 82, of a leaf spring 142 urging the motor base 122 upwardly (toward a turntable 140).

On opposite sides radially spaced apart with the rotary shaft 82 interposed therebetween, the motor base 122 includes extended portions 122*a*, 122*b* of narrow width extending in a direction along the first tilt movement axis. At ends of the extended portions 122*a*, 122*b*, there are provided projections 122*c*, 122*d* of narrower width.

The leaf spring 142 is disposed between the motor base 122 and the outer cylinder end surface 130. At a central part of the leaf spring 142, there is disposed a hole 148 for removably receiving an outer periphery 147 of a short sleeve 122*h* of circular section suspended downwardly from central hole 128 of the motor base 122. At portions on opposite sides, radially spaced apart with the rotary shaft 82 interposed therebetween, along the second tilt movement axis 120, the leaf spring 142 has a flat top surface 142*a* wherein holes 150, 151 are formed. The protrusions 144, 146 on the underside of the motor base 122 are inserted into the holes 150, 151 to thereby restrict the rotation of the leaf spring 142 circumferentially of (in a direction around) the rotary shaft 82. At portions radially spaced apart with the top surface 142*a* interposed therebetween, the leaf spring 142 includes portions 142*b*, 142*c* extending obliquely downwardly, the end portions of which are bent obliquely upwardly to provide bent portions 142*d*, 142*e*. The bent portions 142*d*, 142*e* are slidably held against the outer cylinder end surface 130 of the spindle motor 124.

The spindle motor 124, the leaf spring 142 and the motor base 122 are interconnected by positioning the motor base 122 to cover the external cylinder end surface 130 of the spindle motor 124 with the leaf spring 142 sandwiched therebetween, inserting metallic collars 152, 154 into the holes 136, 138 of the motor base 122 and inserting the screws 132, 134 into the collars 152, 154 and screwing them into the outer cylinder end 130. At this time, the collars 152, 154 are press-held between the bottoms of upper enlarged-diameter portions 132*a*, 132*b* of the screws 132, 134 and the outer cylinder end 130. Between the holes 136, 138 of the motor base 122 and the outer cylinder end, a small gap is formed for enabling vertical and tilt movements of the motor base 122 relative to the collars 152, 154.

With the top surface 142*a* held against the under surface of the motor base 122 and with the bent portions 142*b*, 142*c* held against the outer cylinder end surface 130, the leaf spring 142 is positioned in a compressed state between the motor base 122 and the outer cylinder end surface 130. Thus, the motor base 122 is pressed by the resilient force of the leaf spring 142 up into contact with the under surface of the upper enlarged-diameter portions 132*a*, 134*a* of the screws 132, 134. At this time, a sleeve lower end 122*e* suspended from the center of the motor base 122 terminates above the outer cylinder end surface 130. As a result, the second tilt movement axis 120 is formed along the line of contact between the upper surface of the motor base 122 and the under surfaces of the upper enlarged-diameter portions 132*a*, 134*a* of the screws 132, 134, whereby the spindle motor 124 is fixedly supported on the motor base 122 tiltably in a direction around the second tilt movement axis 120. The turntable 140 is attached to an upper end of the rotary shaft 82.

With the spindle motor 124 received in the opening 72 of the chassis 70, the motor base 122 is disposed with the extended portions 122*a*, 122*b* placed upon the projections 92, 94 of the hollow portion 108 on the upper surface of the chassis 70. At this time, the projections 122*c*, 122*d* at the opposite ends of the motor base 122 are received in the recessed portions 110, 112 of the hollow portion 108 (a tiny gap exits between the projections 122*c*, 122*d* and the recessed portions 110, 112), whereby the movement of the motor base 122 in a direction along the second tilt movement axis 120 is prevented. Stepped portions 122*f*, 122*g* serving as borders between the extended portions 122*a*, 122*b* and the projections 122*c*, 122*d* are opposed to the wall surfaces 114, 116 at the entrance of the recessed portions 110, 112 with a small gap therebetween, whereby the movement of the motor base 12 in a direction along the first tilt movement axis 118 is prevented. In this manner, the line of contact between the lower surface of the motor base 122 and the top potions of the projections 92, 94 form the first tilt movement axis 118 extending therealong, whereby the motor base 122 is supported tiltably in a direction around the first tilt movement axis 118.

Figures 8A, 8B:
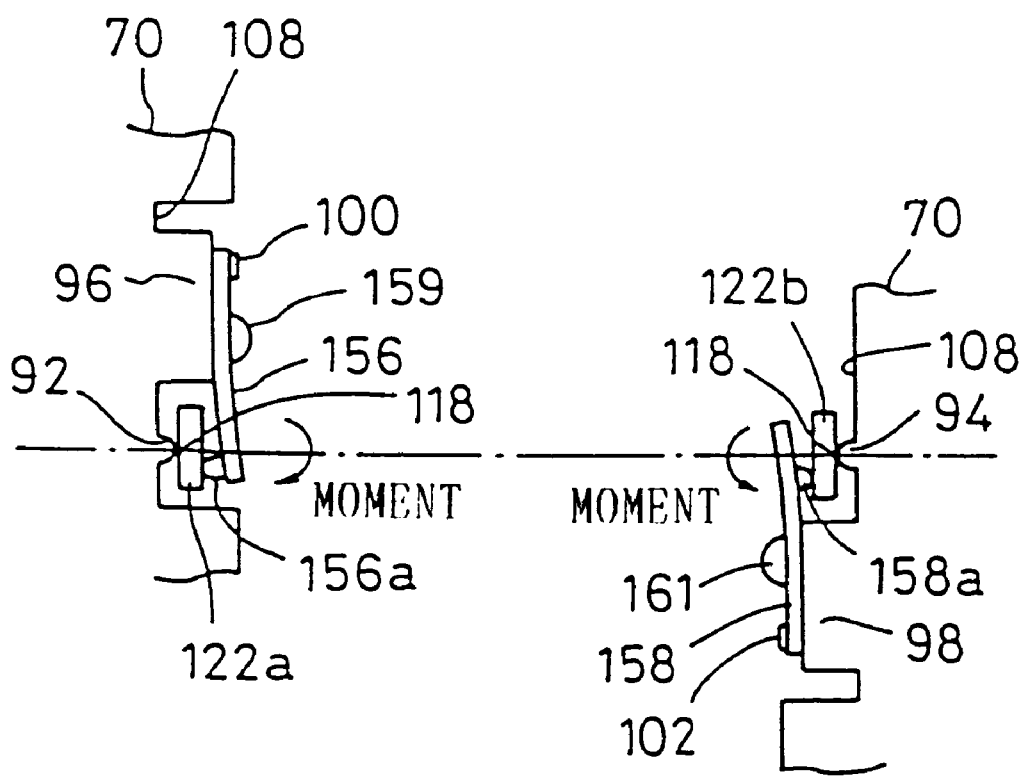
FIG. 8A is a cross-sectional view taken along line E—E of FIG. 1A.
FIG. 8B is a cross-sectional view taken along line F—F of FIG. 1A.

Leaf springs 156, 168 are mounted on the pedestals 96, 98 of the hollow portion 108 by means of screws 159, 161. Formed on the lower surfaces of the leaf springs 156, 158 are projections 156*a*, 156*b* held in contact with the upper surfaces of the extended portions 122*a*, 122*b* of the motor base 122. These contact positions are offset in the same directions relative to the projections 92, 94 on the chassis 70, as best shown in FIGS. 8A and 8B, cross-sectional views taken respectively along lines E—E and F—F of FIG. 1A, whereby the motor base 122 is imparted with an urging force in a direction around the first tilt movement axis 118.

Figure 9:
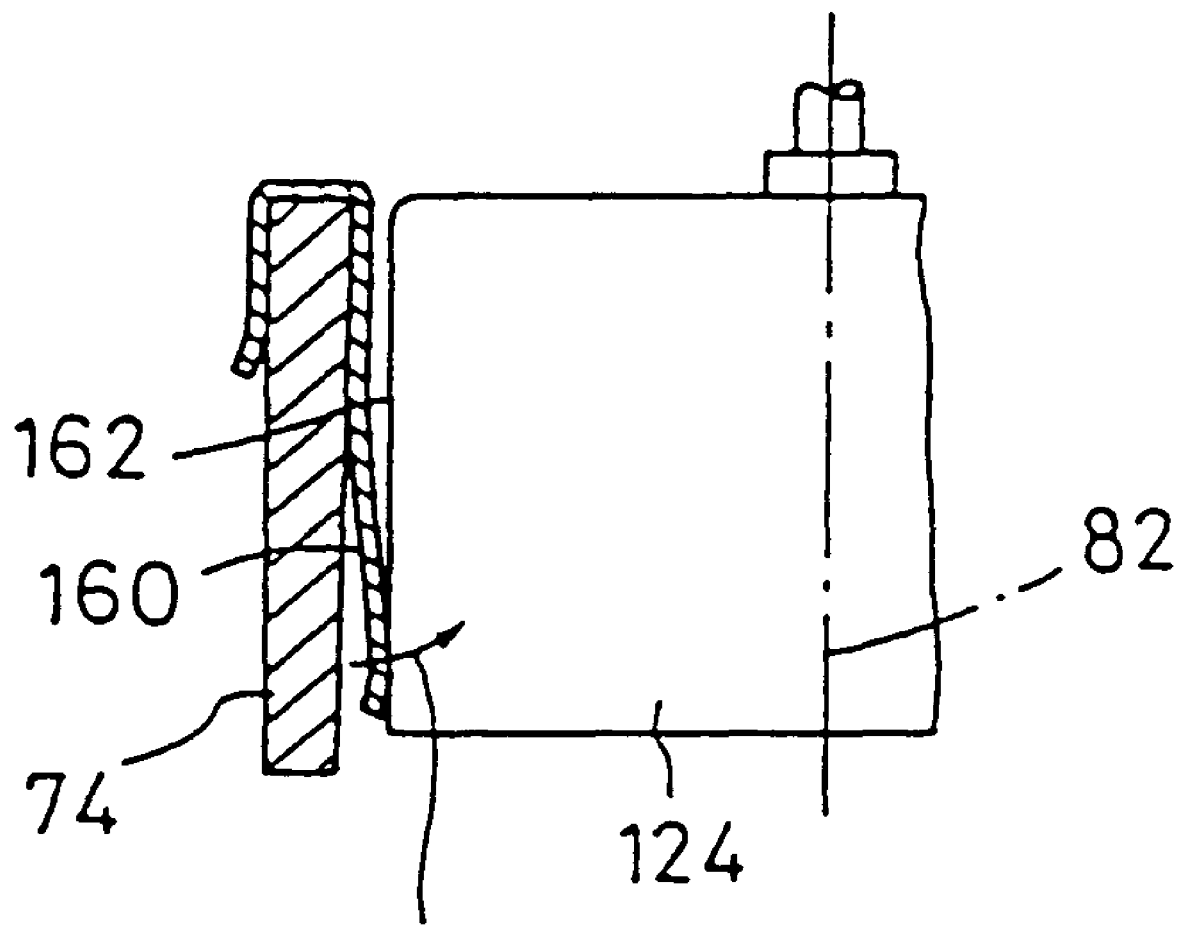
FIG. 9 is a cross-sectional view taken along line G—G of FIG. 1A.

As shown in FIG. 1A, a leaf spring 160 is provided on the sleeve 74 at a position thereof between the first tilt movement axis 118 and the second tilt movement axis 120 in such a manner as to sandwich the wall surface of the sleeve 74. As shown in FIG. 9 which is a cross-sectional view taken along line G—G of FIG. 1A, the leaf spring 160 presses a lower part of an outer cylinder side surface 162 of the spindle motor 124 in an intermediate direction between the direction around the first tilt movement axis 118 and the direction around the second tilt movement axis 120, thereby imparting an urging force in the direction around the first tilt movement axis 118 (urging force in the same direction as those of the urging forces by the leaf springs 156, 158) and an urging force in the direction around the second tilt movement axis 120 to the spindle motor 124.

Figure 10:
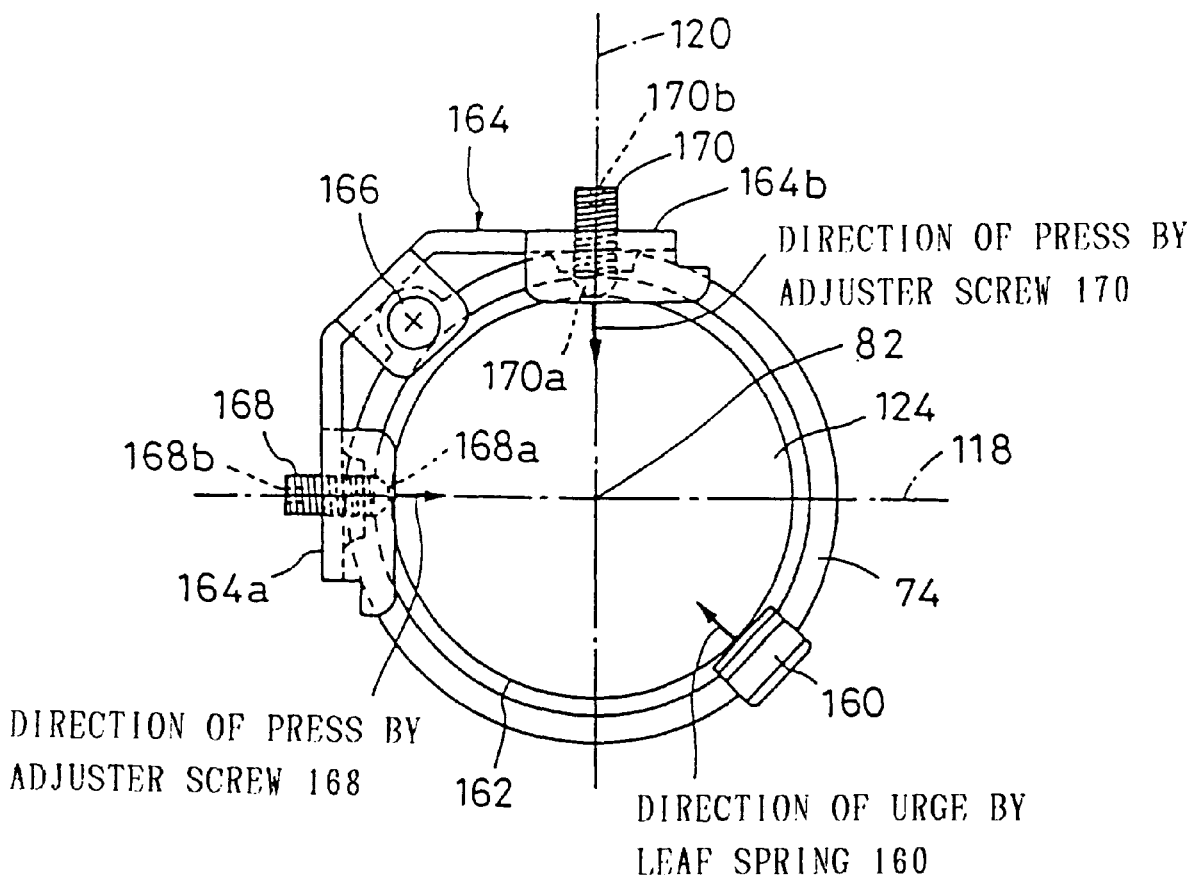
FIG. 10 is a bottom view of the structure of FIG. 1A–1C, showing the positions of adjusting screws.

As shown in FIG. 10, on an outer surface of the sleeve 74 opposite from the leaf spring 160, a metallic tap plate 164 for mounting an adjuster screw is fixedly disposed by threadedly engaging a screw 166 in the screw hole 75 (see FIG. 6) at the end of the sleeve 74. The tap plate 164 has a wall portion 164a formed on a surface perpendicular to the first tilt movement axis 118 and a wall portion 164b formed on a surface perpendicular to the second tilt movement axis 120. Mounted on the wall portion 164a is an adjuster screw 168 oriented in a direction parallel to the first tilt movement axis 118 and perpendicular to the rotary shaft 82. The adjuster screw 168 passes through the sleeve 74 without touching any part of the latter and abuts at its rounded top end 168a against a lower part of the outer cylinder side surface 162 of the spindle motor 124. The adjuster screw 168 is provided at its rear end with a hexagonal hole 168b for receiving a hexagonal wrench. By turning the wrench received in the hole 168b, the adjuster screw 168 is moved axially to thereby push the lower part of the outer cylinder side wall 162 of the spindle motor 124 back in a direction around the second tilt movement axis 120 against the urging force of the leaf spring 160.

On the wall portion 164b of the tap plate 164, there is disposed an adjuster screw 170 oriented in a direction parallel to the second tilt movement axis 120 and perpendicular to the rotary shaft 82. The adjuster screw 170 passes through the sleeve without touching any part of the latter and abuts at its rounded top end 170a against the lower part of the outer cylinder side surface 162 of the spindle motor 124. The adjuster screw 170 is provided at its rear end with a hexagonal hole 170b for receiving a hexagonal wrench. By turning the wrench held in the hole 170b, the adjuster screw 170 is moved axially to thereby press the lower part of the outer cylinder side wall 162 of the spindle motor 124 back in a direction around the first tilt movement axis 118 against the urging force of the leaf spring 160.

With the arrangement thus far explained, the inclination angle of the spindle motor 124 in the direction around the second tilt movement axis 120 can be adjusted in correspondence with the depth of screwing of the adjuster screw 168, whereby the inclination angle in the track-widthwise direction of the optical axis 73 of the optical pickup 76 can be adjusted. Again, the inclination angle of the spindle motor 124 in the direction around the first tilt movement axis 118 can be adjusted in correspondence with the depth of screwing of the adjuster screw 170, whereby the inclination angle in the track-tangential direction of the optical axis 73 of the optical pickup 76 can be adjusted. Since the inclination angle adjustment in the track-tangential direction and the inclination angle adjustment in the track-widthwise direction can be effected independently, the adjustment operation becomes easy.

Further, since the first tilt movement axis 118 and the second tilt movement axis 120 are formed to pass over the rotary shaft 82, the amount of vertical movement of the turntable 140 upon the inclination angle adjustment can be reduced. Still further, since the first tilt movement axis 118 and the second tilt movement axis 120 are formed at an upper part of the rotary shaft 82 (closely to the turntable 140), the amount of horizontal movement of the turntable 140 upon the inclination angle adjustment can be reduced. Moreover, because the adjuster screws 168, 170 are disposed to be oriented in a direction parallel to the surface of an optical disk to be placed on the turntable 140, the adjustment operation can be effected with the optical disk placed on the turntable 140. This further enables the adjustment to be performed real time while observing waveforms reproduced from the optical disk.

Upon completion of the inclination adjustment, an adhesive may be filled between an inner periphery of the sleeve 74 and the outer cylinder side wall 162 of the spindle motor 124 to fixedly join the spindle motor 124 and the chassis 70 together to thereby maintain them in an adjusted condition.

What is claimed is:

1. A spindle motor inclination angle adjusting mechanism in an optical disk apparatus including a spindle motor with a rotary shaft carrying a turntable thereon, a chassis supporting said spindle motor thereon, and an optical pickup disposed on said chassis transferably so that an optical axis of said optical pickup can be moved in a direction substantially perpendicular to said rotary shaft of said spindle motor, for adjusting inclination of said spindle motor relative to said chassis, said adjusting mechanism comprising:

a tilt movement mechanism for supporting said spindle motor on said chassis tiltably both in a direction around a first tilt movement axis extending in a direction perpendicular to said rotary shaft of said spindle motor and perpendicular to a direction of movement of said optical axis of said optical pickup and in a direction around a second tilt movement axis extending in a direction of movement of said optical axis of said optical pickup and being perpendicular to said rotary shaft of said spindle motor, said tilt movement mechanism including a motor base for supporting said spindle motor tiltably in the direction around the second tilt movement axis, said motor base being supported on said chassis tiltably in the direction around the first tilt movement axis;

a first adjusting section for adjusting the inclination angle in the direction around the first tilt movement axis by driving said spindle motor in the direction around the first tilt movement axis; and a second adjusting section for adjusting the inclination angle in the direction around the second tilt movement axis by driving said spindle motor in the direction around the second tilt movement axis, wherein said first and second adjusting sections comprise an urging section for urging said spindle motor in the direction around said first and second tilt movement axes, a first pressing member for pressing said spindle motor back in the direction around said first tilt movement axis against an urging force of said urging section to thereby adjust the inclination angle in the direction around said first tilt movement axis, and a second pressing member for pressing said spindle motor back in the direction around said second tilt movement axis against the urging force of said urging section to thereby adjust the inclination angle in the direction around said second tilt movement axis.

2. A spindle motor inclination angle adjusting mechanism according to claim 1 wherein said urging section comprises a single spring which imparts to said spindle motor an urging force in the direction around said first tilt movement axis and in the direction around said second tilt movement axis by imparting to said spindle motor a pressing force in an intermediate direction between a tilt movement direction by said first tilt movement axis and a tilt movement direction by said second tilt movement axis.

3. A spindle motor inclination angle adjusting mechanism in an optical disk apparatus including a spindle motor with a rotary shaft carrying a turntable thereon, a chassis supporting said spindle motor thereon, and an optical pickup disposed on said chassis transferably so that an optical axis of said optical pickup can be moved in a direction substantially perpendicular to said rotary shaft of said spindle motor, for adjusting inclination of said spindle motor relative to said chassis, said adjusting mechanism comprising:

a tilt movement mechanism for supporting said spindle motor on said chassis tiltably both in a direction around a first tilt movement axis extending in a direction perpendicular to said rotary shaft of said spindle motor and perpendicular to a direction of movement of said optical axis of said optical pickup and in a direction around a second tilt movement axis extending in a direction of movement of said optical axis of said optical pickup and being perpendicular to said rotary shaft of said spindle motor, said tilt movement mechanism including a motor base for supporting said spindle motor tiltably in the direction around the second tilt movement axis, said motor base being supported on said chassis tiltably in the direction around the first tilt movement axis;

a first adjusting section for adjusting the inclination angle in the direction around the first tilt movement axis by driving said spindle motor in the direction around the first tilt movement axis; and a second adjusting section for adjusting the inclination angle in the direction around the second tilt movement axis by driving said spindle motor in the direction around the second tilt movement axis, wherein said motor base is provided with extended portions of narrow width on opposite sides thereof with said rotary shaft interposed therebetween, and said extended portions have a direction of extension perpendicular to the direction of movement of said optical axis of said optical pickup and are supported on said chassis rotatably in a direction around an axis formed by said direction of extension, thereby providing said first tilt movement axis.

4. A spindle motor inclination angle adjusting mechanism according to claim 3 wherein said extended portions of said motor base are supported on said chassis with lower surfaces thereof placed on projections formed on said chassis and with upper surfaces thereof held in contact with projections of a leaf spring mounted on said chassis, and said leaf spring projections are positioned offset relative to said chassis projections so that said leaf spring projections produce a moment which imparts to said motor base an urging force in the same direction as that of an urging force directed around said first tilt movement axis by an urging section.

5. A spindle motor inclination angle adjusting mechanism in an optical disk apparatus including a spindle motor with a rotary shaft carrying a turntable thereon, a chassis supporting said spindle motor thereon, and an optical pickup disposed on said chassis transferably so that an optical axis of said optical pickup can be moved in a direction substantially perpendicular to said rotary shaft of said spindle motor, for adjusting inclination of said spindle motor relative to said chassis, said adjusting mechanism comprising:

a tilt movement mechanism for supporting said spindle motor on said chassis tiltably both in a direction around a first tilt movement axis extending in a direction perpendicular to said rotary shaft of said spindle motor and perpendicular to a direction of movement of said optical axis of said optical pickup and in a direction around a second tilt movement axis extending in a direction of movement of said optical axis of said optical pickup and being perpendicular to said rotary shaft of said spindle motor, said tilt movement mechanism including a motor base for supporting said spindle motor tiltably in the direction around the second tilt movement axis, said motor base being supported on said chassis tiltably in the direction around the first tilt movement axis;

a first adjusting section for adjusting the inclination angle in the direction around the first tilt movement axis by driving said spindle motor in the direction around the first tilt movement axis; and a second adjusting section for adjusting the inclination angle in the direction around the second tilt movement axis by driving said spindle motor in the direction around the second tilt movement axis, wherein protrusions are formed on opposite sides, interposing said rotary shaft of said spindle motor therebetween, of an end surface, opposed to said turntable, of an outer cylinder of said spindle motor, at positions along said second tilt movement axis, and said motor base is mounted on said protrusions in such a manner as to be tiltable in the direction around said second tilt movement axis about said protrusions forming a fulcrum, thereby providing said second tilt movement axis.

6. A spindle motor inclination angle adjusting mechanism according to claim 5 wherein said protrusions comprises metallic pins rising from said positions of said opposite sides of said outer cylinder end surface, said metallic pins pass through said motor base to support said motor base tiltably about said metallic pins as a fulcrum, said metallic pins have upper parts having an increased diameter for preventing retrieval of said pins from said motor base, and a spring is disposed between the outer cylinder end surface of said spindle motor and said motor base for urging said motor base against said increased diameter parts of said metallic pins, whereby said motor base is supported tiltably in the direction around said second tilt movement axis thus formed.

7. A spindle motor inclination angle adjusting mechanism in an optical disk apparatus including a spindle motor with a rotary shaft carrying a turntable thereon, a chassis supporting said spindle motor thereon, and an optical pickup disposed on said chassis transferably so that an optical axis of said optical pickup can be moved in a direction substantially perpendicular to said rotary shaft of said spindle motor, for adjusting inclination of said spindle motor relative to said chassis, said adjusting mechanism comprising:

a tilt movement mechanism for supporting said spindle motor on said chassis tiltably both in a direction around a first tilt movement axis extending in a direction perpendicular to said rotary shaft of said spindle motor and perpendicular to a direction of movement of said optical axis of said optical pickup and in a direction around a second tilt movement axis extending in a direction of movement of said optical axis of said optical pickup and being perpendicular to said rotary shaft of said spindle motor, said tilt movement mechanism including a motor base for supporting said spindle motor tiltably in the direction around the second tilt movement axis, said motor base being supported on said chassis tiltably in the direction around the first tilt movement axis;

a first adjusting section for adjusting the inclination angle in the direction around the first tilt movement axis by driving said spindle motor in the direction around the first tilt movement axis; and a second adjusting section for adjusting the inclination angle in the direction around the second tilt movement axis by driving said spindle motor in the direction around the second tilt movement axis, wherein said spindle motor is tiltably received in a sleeve disposed in said chassis and having an inner diameter larger than an outer diameter of said spindle motor, said adjusting mechanism including:

an urging section including a leaf spring mounted on said sleeve for pressing an outer cylinder side surface of said spindle motor to impart to said spindle motor an urging force in the directions around said first and second tilt movement axes, a first pressing member including a first screw extending in a direction parallel to said second tilt movement axis and perpendicular to said rotary shaft of said spindle motor, mounted on said sleeve and passing through said sleeve for pressing the outer cylinder side surface of said spindle motor in the direction around said first tilt movement axis, and a second pressing member including a second screw extending in a direction parallel to said first tilt movement axis and perpendicular to said rotary shaft of said spindle motor, mounted on said sleeve and passing through said sleeve for pressing the outer cylinder side surface of said spindle motor in the direction around said second tilt movement axis.

8. A spindle motor inclination angle adjusting mechanism, in an optical disk apparatus including a spindle motor with a rotary shaft carrying a turntable thereon, a chassis supporting said spindle motor thereon, and an optical pickup disposed on said chassis transferably so that an optical axis of said optical pickup can be moved in a direction substantially perpendicular to said rotary shaft of said spindle motor, to adjust inclination of said spindle motor relative to said chassis, said adjusting mechanism comprising:

a tilt movement mechanism to support said spindle motor on said chassis tiltably in two directions along two movement axes, said axes perpendicular to each other and to said rotary shaft, with said axes intersecting in the rotary shaft;

a first adjusting section to adjust the inclination angle in the direction around the first tilt movement axis by driving said spindle motor in the direction around the first tilt movement axis; and a second adjusting section to adjust the inclination angle in the direction around the second tilt movement axis by driving said spindle motor in the direction around the second tilt movement axis.

9. A spindle motor inclination angle adjusting mechanism, in an optical disk apparatus including a spindle motor with a rotary shaft carrying a turntable thereon, a chassis supporting said spindle motor thereon, and an optical pickup disposed on said chassis transferably so that an optical axis of said optical pickup can be moved in a direction substantially perpendicular to said rotary shaft of said spindle motor, to adjust inclination of said spindle motor relative to said chassis, said adjusting mechanism comprising:

a tilt movement mechanism to support said spindle motor on said chassis tiltably in two directions along two movement axes, said axes perpendicular to each other and to said rotary shaft, with said axes intersecting in the rotary shaft, said tilt movement mechanism comprising a motor base to support said spindle motor tiltably in the direction around the second tilt movement axis, said motor base being supported on said chassis tiltably in the direction around the first tilt movement axis;

a first adjusting section to adjust the inclination angle in the direction around the first tilt movement axis by driving said spindle motor in the direction around the first tilt movement axis; and a second adjusting section to adjust the inclination angle in the direction around the second tilt movement axis by driving said spindle motor in the direction around the second tilt movement axis, wherein said first and second adjusting sections comprise an urging section to urge said spindle motor in the direction around said first and second tilt movement axes, a first pressing member to press said spindle motor back in the direction around said first tilt movement axis against an urging force of said urging section to thereby adjust the inclination angle in the direction around said first tilt movement axis, and a second pressing member to press said spindle motor back in the direction around said second tilt movement axis against the urging force of said urging section to thereby adjust the inclination angle in the direction around said second tilt movement axis.

* * * * *